United States Patent [19]

Peter et al.

[11] Patent Number: 5,597,602
[45] Date of Patent: Jan. 28, 1997

[54] PROCESS FOR DE-OILING CRUDE LECITHIN

[75] Inventors: Siegfried Peter, Lindenweg 3, D-91080 Uttenreuth-Weiher; Bernd Czech, Erlangen; Eckard Weidner, Erlangen; Zhenfeng Zhang, Erlangen, all of Germany

[73] Assignee: Siegfried Peter, Uttenreuth-Weiher, Germany

[21] Appl. No.: 362,448

[22] PCT Filed: Jul. 6, 1993

[86] PCT No.: PCT/EP93/01750

§ 371 Date: Apr. 21, 1995

§ 102(e) Date: Apr. 21, 1995

[87] PCT Pub. No.: WO94/01004

PCT Pub. Date: Jan. 20, 1994

[30] Foreign Application Priority Data

Jul. 6, 1992 [DE] Germany .................. 42 22 153.6

[51] Int. Cl.[6] .................................................. A23D 7/005
[52] U.S. Cl. ........................... 426/478; 426/492; 554/83
[58] Field of Search .................... 426/478, 492, 426/493, 494, 495, 475; 554/83

[56] References Cited

U.S. PATENT DOCUMENTS

| | | | |
|---|---|---|---|
| 4,367,178 | 1/1983 | Heigel | 554/83 |
| 4,560,513 | 12/1985 | Coenen | 554/83 |
| 4,623,489 | 11/1986 | Rivers | 426/478 |
| 4,828,702 | 5/1989 | Coenen | 554/83 |
| 5,028,449 | 7/1991 | Hatanaka | 426/478 |
| 5,405,633 | 4/1995 | Heidlas | 426/492 |
| 5,466,842 | 11/1995 | Heidlas | 554/83 |

*Primary Examiner*—Carolyn Paden
*Attorney, Agent, or Firm*—Oblon, Spivak, McClelland, Maier & Neustadt, P.C.

[57] ABSTRACT

A process for recovering lecithin from oil- and lecithin-containing mixtures, comprising extracting a lecithin/oil mixture with an extractant selected from the group consisting of a hydrocarbon having 3 carbon atoms, an unbranched hydrocarbon having 4 carbon atoms, a branched hydrocarbon having 4 carbon atoms, and mixtures thereof, at a pressure of from 1 to 8 MPa and a temperature of from 20 to 100° C., which conditions ensure liquid phase extraction with the development of two liquid phases, one of which is an oil enriched liquid hydrocarbon phase and the other of which is a lecithin enriched hydrocarbon phase; separating the two liquid hydrocarbon phases; and recovering substantially lecithin-free oil from the oil-enriched phase and substantially oil-free, pure lecithin from the lecithin-enriched phase.

20 Claims, 2 Drawing Sheets

PROCESS FOR DE-OILING CRUDE LECITHIN

BACKGROUND OF THE INVENTION

1. Field of the Invention

The invention relates to a process for recovering lecithin from oil- and lecithin-containing mixtures by extraction with an extractant comprising at least one hydrocarbon.

2. Description of the Background

The mixture of phosphatides referred to in the trade as lecithin is a group of phospholipids composed of the following structural members: glycerol, fatty acids, phosphoric acid, and amino alcohols and carbohydrates, respectively. They are found in practically any animal and Vegetable material. Ample amounts thereof are present in brain tissue, egg yolk, and oil seeds such as soybean oil and rape-seed oil.

Phosphatides of vegetable origin are generally highly unsaturated. In lecithin preparations of animal origin, there are found, besides glycerol esters, various sphingolipids and plasmalogens as phosphorus-containing compounds. The main constituents of soybean lecithin are phosphatidyl choline, phosphatidyl ethanolamine, phosphatidyl inositol, phosphatidyl serins, phosphatidyl acid, lysophospholipids, and phytoglycolipids.

In vegetable oils from oil seeds and cereal seeds such as soybeans, rape-seed, sunflower seed, corn, hemp and linseed, phosphatides are present in concentrations of from 0.2 to 2% by weight. Also used for the recovery of phosphatides are egg yolk, yeast lipids, and bacterial bio-mass. All of the above materials are suited as a source of phosphatide mixtures in the process of the invention, too. One specific example is the crude lecithin obtained in the refining of vegetable oils and fats.

At present, the major part of commercial lecithine is obtained in the processing of soybean oil and rape-seed oil. They contain lecithin in colloidal from. To the oil, water is added under stirring in accurately measured quantities, and the lecithin contained in the oil is hydrated at elevated temperature. The slimy mixture is separated in a separator and subsequently dried in a drying apparatus under a vacuum. Obtained in this manner is viscous crude lecithin. This crude lecithin recovered by extraction from soybeans or rape-seed in the course of a refining operation consists to about one third of oil and to two thirds of acetone-insoluble components, namely lecithin. For some applications, the oil content is disturbing, and further purification is required.

The term lecithin within the present description does not only mean natural lecithins but also chemically modified lecithins, the latter ones being of increasing interest.

It is state of the art to separate the oil from crude lecithin by extracting with acetone. The powdery product referred to as pure lecithin has a residual oil content of from 2 to 4% by weight. In the course of acetone extraction, there is withdrawn a fat/acetone solution as well as a suspension of phospholipids in acetone. The main part of the acetone is separated from the phospholipids by centrifuging and fed back into the solvent cycle. The partially dried product is then freed of residual solvent in at least two steps. A first drying step is conducted in a fluidized bed drier where the phospholipids are fluidized at about 50° to 70° C. by means of hot air. The main part of acetone is thus removed. To remove even the last traces of solvent, the product is subsequently dried in vacuum drying oven. In this step, thin layers of phospholipids are placed on racks and treated for several hours at elevated temperature (50° to 70° C.). A specific problem of the acetone extraction method are the streams of exhaust air from the drying steps, which may be vented to the environment only after proper purification. Pure lecithin is used not only as an emulsifying food additive but also in undiluted form as a dietetic. Thus, its purity, e.g. freeness of solvent, must meet strict requirements; in the case of acetone with its low threshold value regarding odour, special attention must be given to the above aspect.

The lecithin obtained through acetone extraction must be dried at temperature below 70° C.; otherwise thermal decomposition of the phosopholipids will set in. Even at these temperatures, there will be formed in the course of the drying operation acetone-induced products which impair the organoleptic quality of the de-oiled phospholipids. Described as quality-impairing have been a musty hay-like odour and a sharp pungent aftertaste.

Because of the above described disadvantages of purification with acetone, there have been investigated in recent years alternative methods for the processing of crude lecithin. The complex removal of extractant may be avoided e.g. by using dense gases as solvents.

Disclosed in DE-A 30 11 185 and DE-A 32 29 041 are methods for de-oiling crude lecithin with supercritical dense carbon dioxide and ethane, respectively, wherein the crude lecithin is contacted with the dense gas under conditions that are supercritical with respect to pressure and temperature. Here, the oil preferably dissolves. The loaded gas is transferred from the extracting stage into a regenerating stage where it is separated into gas and extract through variations in pressure and/or temperature. The regenerated gas is fed back into the extracting stage. Since after removal of the major oil portion the lecithin becomes very pasty and, consequently, the material transfer rate is very low, extraction time will be very long. Moreover their Will be required pressures of 35 MPa or more which make the process uneconomical.

To avoid such long extraction times, there was proposed to realize the de-oiling of lecithin by finely distributing the crude lecithin in the carbon dioxide extractant in a nozzle line at brief contact times (DE-A 33 29 249). Obtained here is a powdery, whitish-yellow, oil-free, odourless and tasteless lecithin. The carbon dioxide pressure required for extraction in accordance with the above process is 90 MPa. Due to the high pressure and the low throughput of a nozzle, the process does, however, involve high costs.

Proposed in DE-A 34 11 755 is a process wherein de-oiling of lecithin is accomplished with the aid of dense carbon dioxide to which there has been added a substantial amount of propane as an entraining agent. This procedure has two effects:

(a) the pressure for achieving high loadings of the extractant is reduced to 8 to 12 MPa, and (b) the de-oiled lecithin forms within this pressure range a liquid phase with an extractant composed of 75% of propane and 25% of carbon dioxide, thus permitting countercurrent operation and withdrawal of the de-oiled product from the bottom of the column through a pipe. Carbon dioxide is required so that two phases may form. Under these extracting conditions, the mixture of carbon dioxide/propane is supercritical. The use of an extractant mixture does, however, give rise to additional costs as the composition of the mixture must be continuously controlled and adjusted during the extracting process.

In U.S. Pat. No. 2,548,434 it is suggested a process for the processing of fat containing materials such as oil-seed meals, cracklings and the like. In that process fat is extracted by means of a liquid hydrocarbon which is gaseous at atmospheric pressure. Extraction is conducted at temperatures ranging from 65° to 95° C. Hydrocarbons suited for that process should thus have vapour pressures of greater than 1 atmosphere within this temperature range. The solvent-ratio, expressed in units of volume, should be about 15 to 30. Based on a density of 500 kg/m³ of the liquid hydrocarbon, this corresponds to a loading of 3 to 6% by weight. Pressures ranging from 35 to 45 bar are employed for an-extraction conducted at temperatures of from 79° to 93° C. Upon the addition of bleaching earth to the starting materials, decolorized oils of high quality are thus obtained. Colour bodies, gums and phosphatides remain with the residual materials of vegetable or animal origin.

Suited for that process are solvents at temperatures ranging from about 60° C. below their critical temperature up to a few degrees above said critical temperature. If that extraction process is used for the processing of crude oils two fractions will be obtained, one of these fractions being free of colour bodies, gums and phosphatides while the other one is enriched in phosphatides besides colour bodies and gums. The phosphatides which are present in the starting material in concentrations of up to 0.5% by weight may be thus enriched to concentrations of 3 to 5% by weight.

In contrast thereto, the process for the preparation of pure lecithin according to the present invention starts out from crude lecithin containing phosphatides in concentrations of from 50 to 70% by weight. In the said U.S. Pat. No. 2,548,434, on the other hand, there is disclosed no way of obtaining pure lecithin from crude lecithin.

SUMMARY OF THE INVENTION

It is the object of the invention to provide a process for recovering pure lecithin, which does not involve the above discussed disadvantages and produces at considerably lower pressures than hitherto possible and in high space-time yields substantially oil-free pure lecithin that may be used without restriction in food processing techniques.

Thus, the invention resides in a process for recovering lecithin from oil- and lecithin-containing mixtures by extraction with an extractant comprising at least one hydrocarbon, said process being characterized by conducting extraction with one or more $C_3$- or $C_4$- hydrocarbons under conditions at which the extractant forms a solution of low viscosity with the lecithin and the extracting mixture divides into an oil-enriched liquid phase, and a lecithin-enriched liquid phase, separating the two phases, and recovering through separation of the extractant a substantially lecithin-free oil from the oil-enriched phase as well as a substantially oil-free pure lecithin from the lecithin-enriched phase.

DESCRIPTION OF THE PREFERRED EMBODIMENTS

Figure 1:
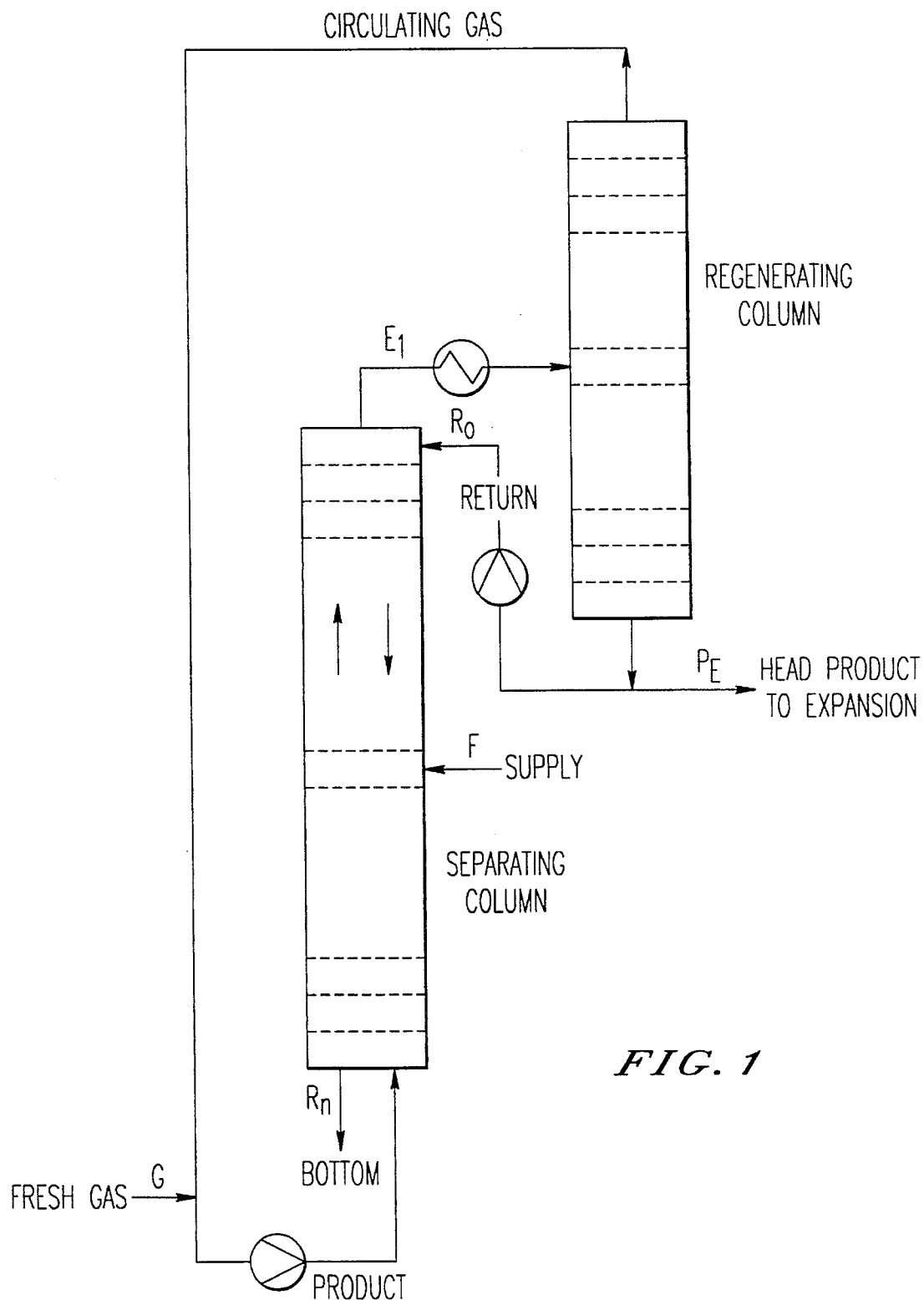

Suited as extractants are branched or unbranched, easily volatile hydrocarbons having a carbon number of 3 and 4 or mixtures thereof; preferred are saturated hydrocarbons. Particularly preferred are hydrocarbons which are Unreservedly admitted for food processing techniques, e.g. propane and butane or mixtures thereof, preferably propane alone or in combination with up to 25% by weight of butane. Pure solvents are preferred over solvent mixtures as they require less effort in controlling.

Unless otherwise specified, "butane" stands for n-butane, iso-butane and mixtures thereof. Commercial type butanes are normally mixtures comprising varying concentrations of n-butane and iso-butane. These mixtures may be used as extractants in the process of the invention, either as such or in combination with the other hydrocarbons previously set forth, without being first separated into the respective isomers.

Solvents employed for extraction should have a high vapour pressure at the respective process temperature. They should preferably have a reduced temperature of from 0.7 to 1.0. At 40° C. the particularly preferred extractant propane has a reduced temperature of 0.85 while butane has a reduced temperature of 0.75.

The above hydrocarbons can be easily separated after extraction at low temperatures. With hydrocarbons boiling below extraction temperature, extraction is conducted at or above the respective vapour pressure. By means of the pressure, one may also control in a simple and reliable manner the concentration of the above specific preferred alkanes in the crude lecithin.

The viscosity of phosphatide/oil mixtures is by 2 to 3 orders of magnitude higher than the viscosity of the respective oils. The phosphatides, upon removal of oil, solidify before the oil is completely removed. When liquid propane is added to an oil-free phosphatide mixture it is observed that a low-viscous mixture is formed only above a specific pressure. Said transition from solid phosphatide to a solution of low viscosity takes place in such a narrow range of temperature and pressure that one can practically refer to this behaviour as a "melting point". This "melting pressure function" is characterized, for instance in the case of propane, by the following data: at 57° C. the transition into a low-viscous solution takes place at 30 bar, at 65° C. it takes place at 40 bar, and at 70° C. it takes place at 50 bar.

By raising, for instance, the propane pressure to about 30 bar, there may be dissolved so much propane in the de-oiled lecithin that the normally plastic mixture forms a liquid of low viscosity that permits continuous countercurrent extraction. A single phase will, however, form when the pressure is equal to or higher than the vapour pressure at room temperature.

Surprisingly, it has been found now that on proper selection of pressure and temperature conditions, there will form in the system of lecithin/oil/hydrocarbon two liquid phases, of which the light phase is enriched in oil and heavy phase in lecithin.

Pressure and temperature depend on the respective extractant and the crude lecithin used. At reduced lecithin content, there is noticed a rise in the temperature at which the system-of lecithin/oil/hydrocarbon divides into two separate phases at constant pressure. In a system of lecithin/soybean oil/propane (lecithin content in the crude lecithin about 65%) and at a propane pressure of 4 MPa, one observes the appearance of two phases at temperatures above about 52° C. In the same system but at a lecithin content of 10% by weight, separation temperature is about 70° C. With de-oiled lecithin and propane, however, the separation temperature lies at 32° C., again at a pressure of 4 MPa.

While within a temperature range of from 50° to 80° C., oil is miscible with liquid propane in any desired proportion, this is not true for crude lecithin. However, when the density of propane is increased by raising the pressure to 4 MPa at 50° C., crude lecithin will also form a liquid phase with propane. At higher temperatures, correspondingly higher pressures are required. On use of butane or mixtures of propane/butane, the pressure at which extractant and de-oiled lecithin will form a liquid phase at the same temperature is lower than on use of propane alone.

In general, the pressure to be employed in the process of the invention is between 1 and 8 MPa, preferably between 3 and 5 MPa.

The upper limits of the temperature are determined by the thermal stability of the lecithin. Thus, the process Of the invention is conveniently conducted at temperatures within the range of from 20° to 100° C., preferably at 30° to 85° C. and in particular at 50° to 70° C.

Lecithin becomes unstable already at temperatures above 70° C. Surprisingly, it has been found that with decreasing concentration of lecithin in the oil the temperature stability rises so that, with decreasing lecithin concentration, higher extraction temperatures are possible without impairment of the lecithin. However, oil-free phosphatides should not possibly be processed at temperatures above 70° C.

When preparing oil-free lecithins by means of liquid hydrocarbons the following limitations must thus be considered, i.e. the limit of thermal stability, on one hand, and the melting pressure function, on the other hand. Additionally, attention has to be paid to the fact that a phosphatide/oil mixture in the presence of hydrocarbon will form a one-phase mixture at high pressures. For instance, crude lecithin obtained from soybeans having an oil content of 35% by weight will form one single phase at a propane pressure of 40 bar.

It has surprisingly been found that it is particularly advantageous to conduct countercurrent extraction at a specific temperature profile. Of course, said temperature profile has to be adapted to the respective chosen working pressure. Use of such temperature profile meets best with the limitations of operating conditions by the melting pressure function, the limit of thermal stability and the onset of single-phase behaviour. However, it restricts the possible hydrocarbons to propane and butane.

The above problems also pertain to the processing of chemically modified phosphatides which normally occur in form of mixtures with oil. The melting pressure function of modified phoshatides is not significantly different from the melting pressure function of natural phosphatides. Chemically modified phosphatides may thus also be obtained in pure form by the process of the present invention.

When using a temperature profile, the temperature at the lower end of the extraction device is suitably lower by 10° to 80° C., preferably by 20° to 70° C., and in particular 30° to 50° C. than the temperature at the head of the extraction device. As mentioned above, the light phase becomes oil-enriched towards the head of the separating device and thus less temperature sensitive. The temperature of the extract may therefore be higher than the temperature critical for lecithins of about 70° C.; it is preferably between 60° and 100° C. The refined material at the lower end of the separating device preferably has a temperature of from 20° to 60° C.

As mentioned before, pure solvents are preferred over solvent mixtures as they require less effort in control and adjustment. Especially suited as a pure solvent is propane. Not only does the directive of EC-Commission 88/344/CEE (Journal officiel des communities europeennes No. L 157/28 of Jun. 24, 1988) permit its unrestricted use as a solvent of Group 1. in the food industry, but pressure and temperature ranges of the extraction are also particularly favourable for propane so that an economic extraction of the crude lecithin is possible.

Thus, a mixture of 85 g of crude lecithin and 115 g of propane divides at 60° C. and 4 MPa into a light phase comprising 84% by weight of propane and 16% by weight of practically non-volatile material as well as a heavy phase comprising 31% by weight of propane and 69% by weight of practically non-volatile material. The dissolved substance in the light phase consist to 65% by weight of oil and to 35% by weight of phosphatides. In the heavy phase, lecithin and oil are dissolved in a ratio of 6/1. The separating factor of about 11 is very favourable.

Pure ethane and pure butane are less suited as extractants. With ethane, formation of a liquid solution of phosphatides in any appreciable concentration cannot be realized up to a pressure of 50 MPa. The same applies to temperatures below the critical temperature of 28° C. Thus, ethane may hardly be used as a sole solvent under economically attractive conditions.

When butane is used as extractant, the separation temperature rises to values at which lecithin becomes unstable. In a system of crude lecithin/isobutane, the separation temperature is 100° C. at 2.2 MPa. An advantage of the use of butane is a reduction of the operating pressure to about 1 to 3 MPa. At very short dwelling times, one might even tolerate exceeding of the temperature of 70° C. But propane will generally be preferred so as to safely prevent impairment of the product quality due to thermal damage.

Even though butane is less preferred as sole solvent than propane, it may, just like the other solvents mentioned above, still be suited as an extractant when mixed the other previously mentioned hydrocarbons. For example, the separating temperature of propane admixed with 25% by weight of iso-butane is 62° C. at 4 MPa. An appropriate feeding temperature will then suitably be 67° C. The example proves that, although pure solvents are preferred, some residual content of butane in the propane has no adverse effect on the (countercurrent) extraction.

Figure 2:
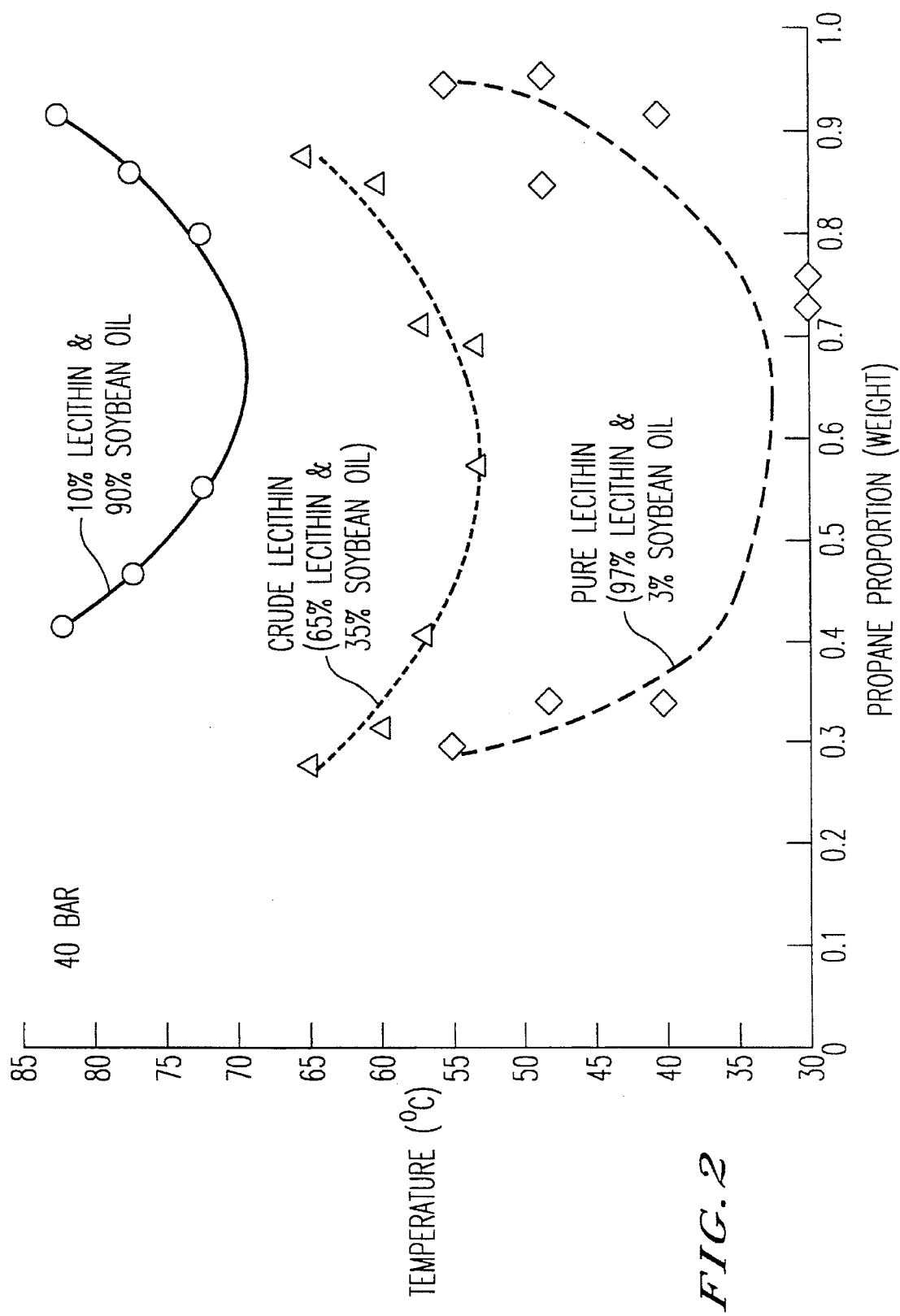

The invention is illustrated by the drawings wherein FIG. 1 shows an extraction device suited for the process of the invention; in FIG. 2, the propane concentration in the coexisting phases is plotted against the temperature for the various lecithin/oil ratios.

For reasons of economics, the extraction process of the invention is preferably conducted as a continuous counter-current operation. Suited for this process is the apparatus which is schematically represented in FIG. 1. It consists essentially of an extraction column (separating column) and a regenerating column.

The viscous crude lecithin is pumped into the separating column at desired level, preferably in the middle of the column. Extractant is suitably added at the bottom part of the column and flows through the extraction. Column from the bottom towards the top. Pressure and temperature are adjusted in such a manner that the mixture is divided into two liquid phases. Oil and a minor amount of lecithin dissolve in the extractant. A mixture of oil, extractant and lecithin leaves the extraction column at the head thereof and is led into the regenerating column. By raising the temperature and/or reducing the pressure, the conditions within the regenerating column are such that the extractant is present as a vapour, i.e., the pressure in the regenerating column is lower than the vapour pressure of the extractant at the respective temperature. Thus, the dissolved substances precipitate quantitatively.

The extractant leaves the regenerating column in a vaporized state at the head of the column. It is condensed in a heat exchanger and pumped back into the extraction column.

Part of the product precipitated in the regenerating column is suitably recycled as reflux to the head of the extraction column. The remaining part of the extracted oil is withdrawn from the bottom of the regenerating column. Extractant is separated from the oil by reducing the, pressure and/or raising the temperature. In the case of extractants which are gaseous at room temperature, separation is appropriately accomplished by expansion to environmental pressure. Depending on the scale of production, the released gaseous extractant is either recompressed and condensed, respectively, or burned off.

Due to its higher density, the liquid lecithin flows downwards in the extraction column and is thus freed of oil. The resulting pure lecithin is withdrawn from the bottom of the extraction, column. By reducing the pressure and/or increasing the temperature the extractant is separated from the lecithin. Escaping solvent may, if desired, be recovered through compression and/or condensation. The lecithin is obtained as a tasteless, odourless, whitish-yellow powder which is free of solvent.

To maintain a two-phase system during the extraction operation, the extraction column is suitably equipped with devices capable of creating a temperature gradient. As previously explained, it is preferred to adjust the temperature at the head of the extraction column to be higher by 10° to 80° C., preferably by 20° to 70° C. and in particular by 30° to 50° C. than the temperature at the column bottom. To create such a temperature gradient, there may be used e.g.. in-line heat exchangers. They serve to maintain within the column at constant pressure two liquid phases, irrespective of the ratios between oil and lecithin.

In FIG. 2, the propane concentration in coexisting phases is shown as a function of temperature for the lecithin/oil ratios of 65/35, 10/90, and 97/3, respectively. In the first case, the separating temperature of the pseudo-binary system is about 52° C., and it is about 70° C. in the second case. At 40° C. and 4 MPa, for example, so much propane is dissolved in the pure lecithin that the pure lecithin is present as a liquid of low viscosity.

The following examples-illustrate the process of the invention.

EXAMPLE 1

Crude lecithin containing 40% by weight of oil and 60% by weight of lecithin is processed in an apparatus according to FIG. 1. The crude lecithin is pumped into the extraction column (separating column) at a point approximately in the middle thereof. The column is equipped with a wire net packing, Type Sulzer CY, as well as with in-line heating elements for controlling the temperature in the various .column sections. The rectifying zone has 8 and the stripping zone 10 theoretical plates. Propane is used as-an extractant at a pressure of 4 MPa. The extractant flows from the bottom towards the head of the column. The temperature at the point of supply is 65° C., at the bottom 45° C., and at the head 80° C. Loading of the propane is about 15% by weight. The lecithin phase in the bottoms comprises about 31% by weight of propane.

The loaded extractant leaving the head of the extraction column is fed approximately into the middle of the regenerating column. The regenerating column operates at 80° C. and 2 MPa. Propane is gaseous under these conditions,. and the substances dissolved in propane precipitate completely. The extract is withdrawn at the bottom of the regenerating column, and part of the extract (about 20% by weight) is recycled as reflux to the head of the extraction column. The rest is expanded to ambient pressure, the propane being thus released from solution. After removal of still dissolved propane, the extract consists to 98%. by weight of oil and 2% by weight of lecithin.

The refined material freed of oil is withdrawn at the bottom of the extraction column. Dissolved propane evaporates on expansion to ambient pressure. Through evaporation enthalpy, the product is cooled. The resulting fine lecithin powder consists to 98% by weight of phosphatides and 2% by weight of accompanying material.

EXAMPLE 2

Crude lecithin containing 35% by weight of oil and 65% by weight of lecithin is extracted in the apparatus according to FIG. 1. The crude lecithin is pumped at a temperature of 60° C. approximately into the middle of the extraction column. The column is equipped with a wire net packing, Type Sulzer CY, as well as with in-line heating elements for controlling the temperature within the various column sections. The rectifying zone has 8 and the stripping zone 10 theoretical plates. Propane containing 5% by weight of iso-butane serves as an extractant, the pressure being 3.5 MPa. The extractant flows from the bottom towards the head of the column. The temperature at the point of supply is 60° C., at the bottom 40° C., and at head 85° C. Loading of the extractant is about 20% by weight. The lecithin phase at the bottom contains about 34% by Weight of dissolved extractant. About one half of the coexisting, oil-enriched liquid phase at the head of the column consists of extractant, the other half of practically non-volatile substances.

The loaded extractant leaving the head of the extraction column is fed approximately into the middle of the regenerating column. The regenerating column operates at 85° C. and 2 MPa. The extractant is gaseous under these conditions, and dissolved substances precipitate completely. The extract is withdrawn at the bottom of the regenerating column, and part of the extract (about 20% by weight) is recycled as reflux to the head of the extraction column. The rest is expanded to ambient pressure, the extractant being thus released from solution. After removal of still dissolved extractant, the extract consists to 98% by weight of oil and 2% by weight of lecithin.

The refined material freed of oil is withdrawn at the bottom of the extraction column. Dissolved extractant evaporates on expansion to ambient pressure. Through evaporation enthalpy, the product is cooled. The resulting fine lecithin powder consists to 98% by weight of phosphatides and 2% by weight of accompanying material.

EXAMPLE 3

Crude lecithin containing 35% by weight of oil and 65% by weight of lecithin is separated in an apparatus according to FIG. 1. The crude lecithin is pumped into the extraction column (separating column) at a point approximately in the middle thereof. The column is equipped with a Sulzer packing, Type CY, as well as with heating elements for controlling the temperature in the various column sections. Propane is used as an extractant starting at a pressure of 5 MPa. The extractant flows from the bottom towards the head of the column. The temperature at the point of supply is 64° C., at the bottom 55° C., and at the head 85 ° C. Separation at this pressure and these temperatures is not possible, however, because the system lecithin/oil/propane consists only of a single phase.

To obtain a two-phase system, pressure was decreased in a second step to 3 MPa at constant temperature profile. Observing the system through a transparent cell integrated in the high pressure column, it was found that, indeed, two phases formed. Continuous separation in a countercurrent process, however, was not possible, because the lecithin precipitated in the lower part of the column as a solid and plugged the wire packing.

By slightly increasing the pressure to 3,5 MPa it was possible to liquidize the sticking lecithin. At the same time a two-phase system was observed. Under these conditions, the column could be maintained under continuous countercurrent operation for several days.

Reliable, trouble-free operation of the column is possible only between a lower limit, i.e. the conditions of solidification, and an upper limit, i.e. the formation of a single phase. The present example demonstrates how these limits may be determined by means of simple experiments.

EXAMPLE 4

Modified crude lecithin containing 35% by weight of oil and 65% by weight of chemically modified lecithin is separated in an apparatus according to FIG. 1. The lecithin was chemically modified by substituting the hydrogen atoms of the phosphatidyl ethanolamine by $CH_3$-groups. Through this acetylation the lecithin's content of particularly valuable phosphatidyl choline is increased.

The acetylated crude lecithin is pumped into the extraction column (separating column) at a point approximately in the middle thereof. The column is equipped with a Sulzer packing, Type BX, as well as with in-line heating elements for controlling the temperature in the various column sections. Propane is used as an extractant at a pressure of 4 MPa. The extractant flows from the bottom towards the head of the column. The temperature at the point of supply is 64° C. at the bottom 55° C., and at the head 85° C.

The propane leaving the extraction column is fed approximately into the middle of the regenerating column. The regenerating column operates at 85° C. and 2.2 MPa. Propane is gaseous under these conditions, and the substances dissolved therein precipitate completely. The extract is withdrawn at the bottom of the regenerating column and is expanded to ambient pressure. The thus obtained gas-free extract contains less than 1% of lecithin.

The refined material freed of oil is withdrawn at the bottom of the extraction column. A hollow cone nozzle having a diameter of 0.3 mm and a spraying angle of 60° is used as withdrawal device. Within the stream of sprayed material, dissolved propane evaporates on expansion to ambient pressure. Through evaporation of propane, the product is cooled and obtained in solid form as a finely dispersed, flowable powder. The thus obtained lecithin is free of triglycerides and consists to more than 95% of phosphatides.

EXAMPLE 5

Modified crude lecithin Containing 35% by weight of oil and 65% by weight of heat stabilized lecithin is separated in an apparatus according to FIG. 1. Stabilization of the lecithin is accomplished by filtration wherein the major quantity of temperature sensitive protein- and sugar- containing impurities is removed. In addition, part of the hydrogen atoms of phosphatidyl ethanolamine is substituted by $CH_3$-groups. Through this partial acetylation the lecithin's content of particularly valuable phosphatidyl choline is increased.

The modified crude lecithin is pumped into the extraction column (separating column) at a point approximately in the middle thereof. The column is equipped with a Sulzer packing, Type BX, as well as with in-line heating elements for controlling the temperature in the various column sections. Propane is used as an extractant at a pressure of 4 MPa. The extractant flows from the bottom towards the head of the column. The temperature at the point of supply is 64° C., at the bottom 55° C., and at the head 85° C.

The propane leaving the extraction column is fed approximately into the middle of the regenerating column. The regenerating column operates at 85° C. and 2.2 MPa. Propane is gaseous under these conditions, and the substances dissolved therein precipitate completely. The extract is withdrawn at the bottom of the regenerating column and is expanded to ambient pressure. The thus obtained gas-free extract contains less than 1% of lecithin.

The refined material freed of oil is withdrawn at the bottom of the extraction column. A hollow cone nozzle having a diameter of 0.3 mm and a spraying angle of 60° is used as withdrawal device. Within the stream of sprayed material, dissolved propane evaporates on expansion to ambient pressure. Through evaporation of propane, the product is cooled and obtained in solid form as a finely dispersed, flowable powder. The thus obtained lecithin is free of triglycerides and consists to more than 95% of phosphatides. It may be directly used in this form or may be subjected to screening and granulation.

EXAMPLE 6

Modified crude lecithin containing 35% by weight of oil and 65% by weight of lecithin is separated in an apparatus according to FIG. 1. The lecithin was chemically modified by hydrolysing in an aqueous solution, by means of a phospholipase, the fatty acid residues that were bound to the phospholipids. The thus obtained, dried lecithin has a high content of lysophosphatidyl choline (LPC), lysophosphatidyl ethanolamine (LPE) and lysophosphatidyl inositol (LPI). It may be used with advantage e.g. in the preparation of liposomes.

The hydrolysed crude lecithin is pumped into the extraction column (separating column) at a point approximately in the middle thereof. The column is equipped with a mixer/settler packing as well as with in-line heating elements for controlling the temperature in the various column sections. Propane is used as an extractant at a pressure of 4 MPa. The extractant flows from the bottom towards the head of the column. The temperature at the point of supply is 65° C. at the bottom 55° C. and at the head 75° C.

The propane leaving the extraction column is fed approximately into the middle of the regenerating column. The regenerating column operates at 90° C. and 2.2 MPa. Propane is gaseous under these conditions, and the substances dissolved therein precipitate completely. The extract is withdrawn at the bottom of the regenerating column and is expanded to ambient pressure. The thus obtained gas-free extract contains less than 1% of lecithin.

The refined material freed of oil is withdrawn at the bottom of the extraction column. A control valve followed by a diffuser is used as withdrawal device. Within the stream of sprayed material, dissolved propane evaporates on expansion to ambient pressure. Through evaporation of propane, the product is cooled and obtained in solid form as a finely dispersed, flowable powder. The thus obtained lecithin is free of triglycerides and consists to more than 95% of phosphatides.

EXAMPLE 7

Upon total extraction of powdered egg yolk using aqueous ethanol of high concentration, a mixture consisting of 70% of triglycerides, 5% of cholesterol and 25% of phospholipids is obtained. Unlike phospholipids of vegetable origin, these phospholipids mainly consist of phosphatidyl choline (>70%). The remainder essentially consists of phosphatidyl ethanolamine. Other phosphatides such as phosphatidyl inositol are absent or present only in trace amounts. An oil-free product would be particularly useful for dietary applications and in baby food.

The total extract of powdered egg yolk is separated in an apparatus according to FIG. 1. The starting material is pumped into the extraction column (separating column) at a point approximately in the middle thereof. The column is equipped with a Sulzer packing, Type BX, as well as with in-line heating elements for controlling the temperature in the various column sections. Propane is used as an extractant at a pressure of 4 MPa. The extractant flows from the bottom towards the head of the column. The temperature at the point of supply is 69° C., at the bottom 55° C., and at the head 85° C.

The propane leaving the extraction column is fed approximately into the middle of the regenerating column. The regenerating column operates at 85° C. and 2.2 MPa. Propane is gaseous under these conditions, and the substances dissolved therein precipitate completely. The extract is withdrawn at the bottom of the regenerating column and is expanded to ambient pressure. The thus obtained gas-free extract contains less than 1% of lecithin; it also contains about 5% cholesterol.

The refined material freed of oil is withdrawn at the bottom of the extraction column. A hollow cone nozzle having a diameter of 0.3 mm and a spraying angle of 60° is used as withdrawal device. Within the stream of sprayed material, dissolved propane evaporates on expansion to ambient pressure. Through evaporation of propane, the product is cooled and obtained in solid-form as a powder. Due to its high phosphatidyl choline content, this product tends to stick together. By adding a few percent of a separating agent to the crude lecithin, a flowable refined material will be obtained. For instance starch, magnesium stearate, aerosil, or the like may be used as separating agents. The thus obtained lecithin is free of triglycerides and consists to more than 90% of phosphatides. It still contains about 7% of cholesterol.

EXAMPLE 8

Upon total extraction of liquid egg yolk, a mixture consisting of 70% of triglycerides, 5% of cholesterol and 25% of phospholipids is obtained. Unlike phospholipids of vegetable origin, these phospholipids mainly consist of phosphatidyl choline (>70%). The remainder essentially consists of phosphatidyl ethanolamine. Other phosphatides such as phosphatidyl inositol are absent or present only in trace amounts. An oil-free product would be particularly useful for dietary applications and in baby food.

The total extract from liquid egg yolk is separated in an apparatus according to FIG. 1. The starting material is pumped into the extraction column (separating column) at a point approximately in the middle thereof. The column is equipped with a Sulzer packing, Type BX, as well as with in-line heating elements for controlling the temperature in the various column sections. Propane is used as an extractant at a pressure of 4 MPa. The extractant flows from the bottom towards the head of the column. The temperature at the point of supply is 69° C., at the bottom 55° C., and at the head 85° C.

The propane leaving the extraction column is fed approximately into the middle of the regenerating column. The regenerating column operates at 85° C. and 2.2 MPa. Propane is gaseous under these conditions, and the substances dissolved therein precipitate completely. The extract is withdrawn at the bottom of the regenerating column and is expanded to ambient pressure. The thus obtained gas-free extract contains less than 1% of lecithin; it also contains about 5% cholesterol.

The refined material freed of oil is withdrawn at the bottom of the extraction column. A hollow cone nozzle having a diameter of 0.3 mm and a spraying angle of 60° is used as withdrawal device. Within the stream of sprayed material, dissolved propane evaporates on expansion to ambient pressure. Through evaporation of propane, the product is cooled and obtained in solid form as a powder. Due to its high phosphatidyl choline content, this product tends to stick together. By adding a few percent of a separating agent to the crude lecithin, a flowable product will be obtained. For instance starch, magnesium stearate, aerosil, or the like may be used as separating agents. The thus obtained. lecithin is free of triglycerides and consists to more than 90% of phosphatides. It still contains about 7% of cholesterol.

What is claimed as new and is desired to be secured by Letters Patent is:

1. A process for recovering lecithin from oil- and lecithin-containing mixtures, comprising:

extracting a lecithin/oil mixture with an extractant selected from the group consisting of a hydrocarbon having 3 carbon atoms, an unbranched hydrocarbon having 4 carbon atoms, a branched hydrocarbon having 4 carbon atoms, and mixtures thereof, at a pressure of from 1 to 8 MPa and a temperature of from 20° to 100° C., which conditions ensure liquid phase extraction with the development of two liquid phases, one of which is an oil enriched liquid hydrocarbon phase and the other of which is a lecithin enriched hydrocarbon phase;

separating the two liquid hydrocarbon phases; and recovering substantially lecithin-free oil from the oil-enriched phase and substantially oil-free, pure lecithin from the lecithin-enriched phase.

2. The process according to claim 1, wherein the extractant is selected from the group consisting of propane, butane and mixtures thereof.

3. The process according to claim 1, wherein said extractant is propane or a mixture of propane with up to 25% by weight of butane.

4. The process according to claim 1, wherein the extraction is conducted at a pressure of from 3 to 5 MPa.

5. The process according to claim 1, wherein the extraction is conducted at a temperature of from 30° to 85° C.

6. The process according to claim 5, wherein said temperature ranges from 50° to 70° C.

7. The process according to claim 1, wherein said starting lecithin/oil mixture is natural or chemically modified lecithin of vegetable or animal origin further containing oils or fats.

8. The process according to claim 7, wherein said natural lecithin of vegetable origin is vegetable oil obtained from seeds selected from the group consisting of soy-beans, rape-seed, sunflower seed, corn, hemp and linseed.

9. The process according to claim 1, wherein said extraction and separation steps are conducted in a separating column (extraction column) in which a lecithin-enriched extract is withdrawn from the bottom of the separating column and an oil-enriched extract is withdrawn from the head of the separating column.

10. The process according to claim 9, wherein said extraction in the separating column is conducted continuously by countercurrent flow.

11. The process according to claim 9, wherein a temperature gradient is created within the separating column such that the temperature at the head of the column is greater by 10° to 80° than the temperature at the bottom of the column.

12. The process according to claim 11, wherein said higher temperature ranges from 20° to 70° C.

13. The process according to claim 12, wherein said higher temperature ranges from 30° to 50° C.

14. The process according to claim 11, wherein the temperature of the refined material leaving the bottom of the separating column ranges from 20° to 60° C. and the temperature of the extract withdrawn from the column head is from 60° to 100° C.

15. The process according to claim 9, wherein the separation step is conducted by withdrawing the oil-enriched extract from the head of the separating column and passing the extract into a regenerating column in which the material is separated into extractant and product by reducing the pressure, raising the temperature or both in the regenerating column.

16. The process according to claim 15, wherein the portion of the product withdrawn from the bottom of the regenerating column is recycled as a reflux material into the extraction column.

17. The process according to claim 16, wherein the withdrawn material is recycled into the head of the extraction column.

18. The process according to claim 9, wherein the lecithin-enriched phase withdrawn from the bottom of the separating column is separated into substantially oil-free, pure lecithin and an extractant by reducing pressure, raising temperature or both in the separating column.

19. The process according to claim 15, wherein the extractant separated from the regenerating column is recompressed, condensed or both and is recycled for use.

20. The process according to claim 18, wherein the extractant separated from the regenerating column is recompressed, condensed or both and is recycled for use.

* * * * *

UNITED STATES PATENT AND TRADEMARK OFFICE
CERTIFICATE OF CORRECTION

PATENT NO. : 5,597,602
DATED : JANUARY 28, 1997
INVENTOR(S) : SIEGFRIED PETER ET AL.

It is certified that error appears in the above-identified patent and that said Letters Patent is hereby corrected as shown below:

Column 1,   line 39, "from" should read --form--.

Column 2,   line 36, "their Will" should read --there will--.

Column 6,   line 29, "mixed the other" should read --mixed with the other--.

Column 7,   line 54, "as-an" should read --as an--.

Column 10,  line 64, "the-product" should read --the product--.

Signed and Sealed this

Sixteenth Day of June, 1998

Attest:

BRUCE LEHMAN

Attesting Officer    Commissioner of Patents and Trademarks